Figure 1:
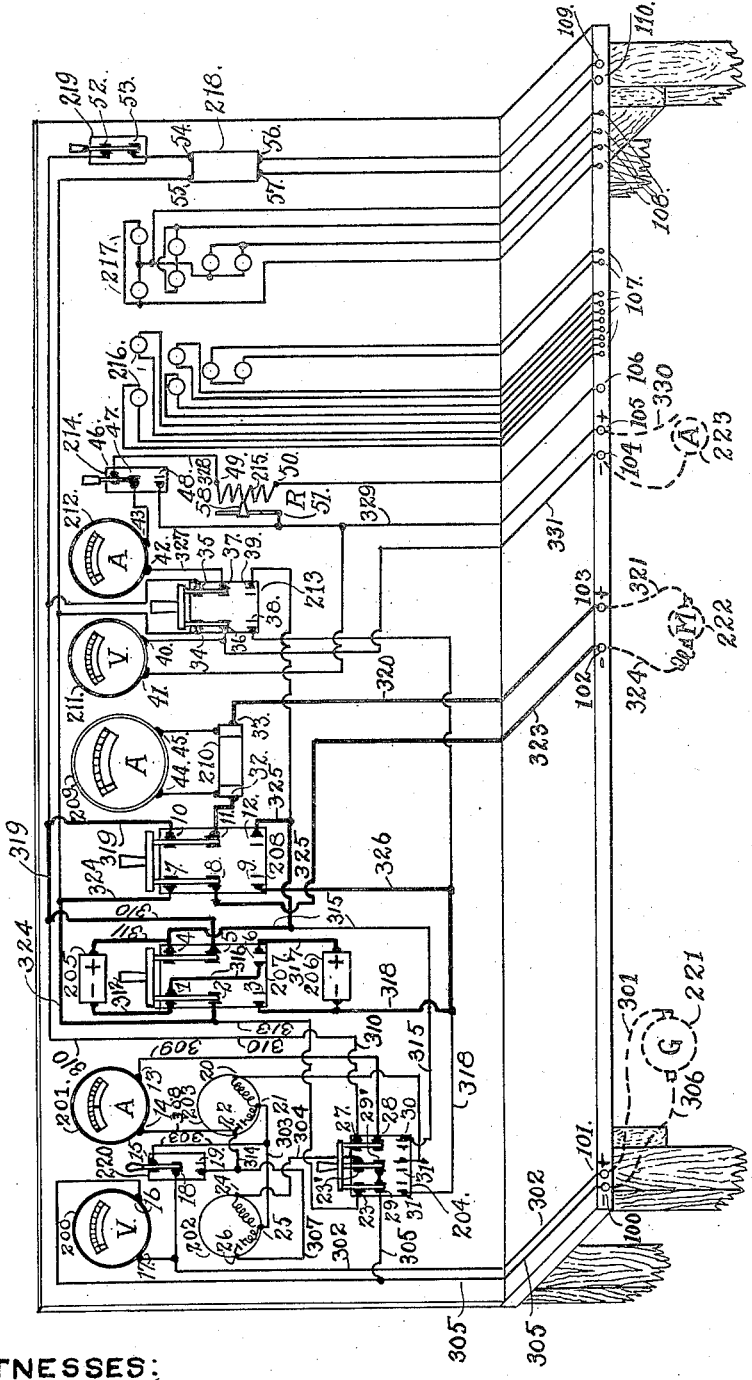

Sept. 20, 1927.  A. C. LYEN ET AL  1,642,883

SWITCHBOARD

Filed Sept. 27, 1922  2 Sheets-Sheet 1

WITNESSES:
Arthur L Hedges
Earl F. Miller

INVENTORS
Andrew C. Lyen
and Charles W. Morgan

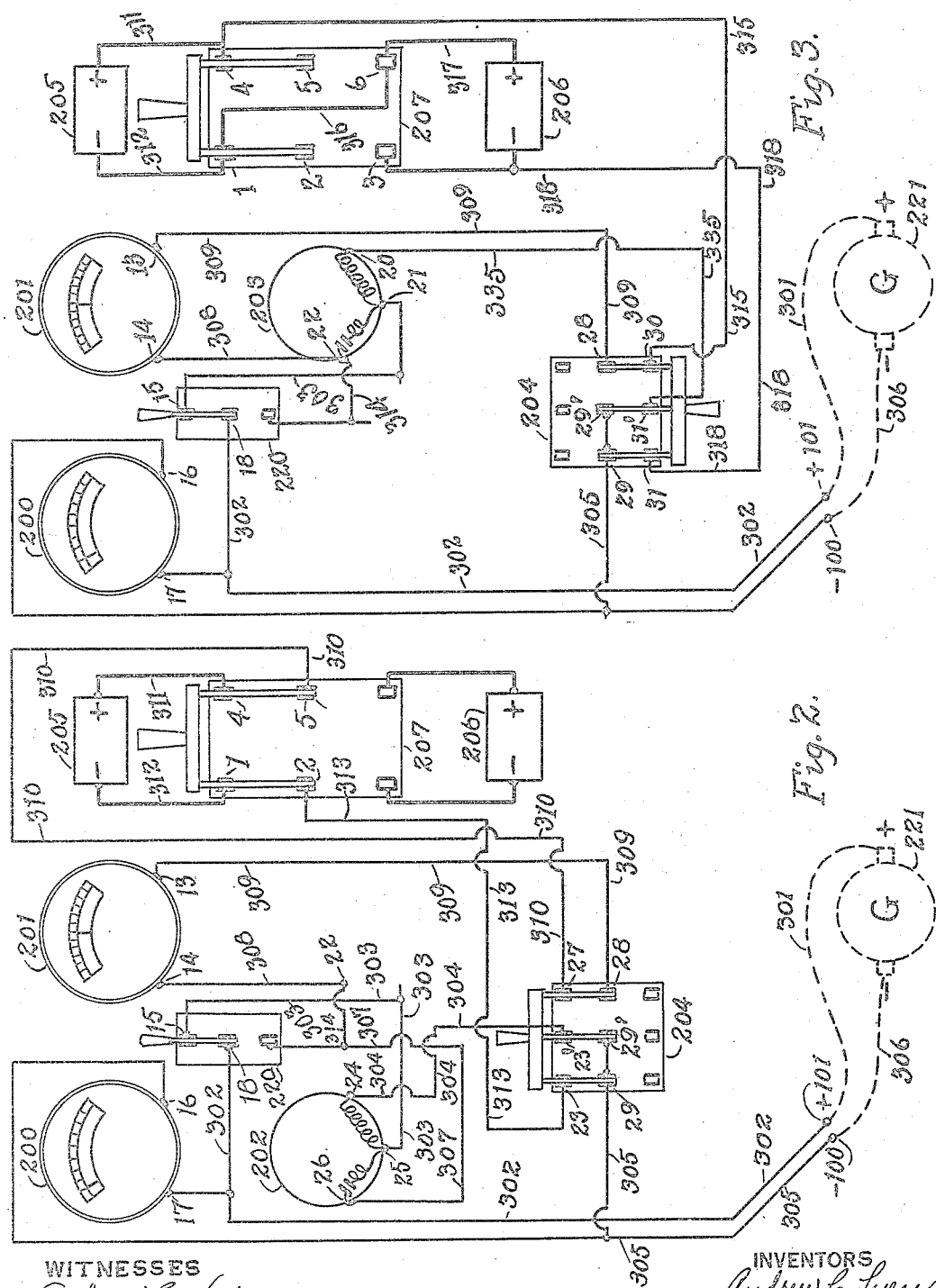

Patented Sept. 20, 1927.

1,642,883

UNITED STATES PATENT OFFICE.

ANDREW C. LYEN AND CHARLES W. MORGAN, OF CHICAGO, ILLINOIS.

SWITCHBOARD.

Application filed September 27, 1922. Serial No. 590,990.

This invention relates to switchboards for testing purposes and has particular reference to that class of switchboards used in connection with testing benches for determining the functioning of automotive electrical devices such as small generators, starting motors, ammeters, switches, relays, etc.

One of the objects of our invention is to provide a switchboard with a system of electrical distribution such that the aforementioned generators, starters, ammeters, etc., while in temporary connection with the system, may be tested simultaneously at equal or different voltages without the testing of one device materially interfering with that of another. A second object of our invention is to so design the system that one group or set of storage batteries may be used in common for all the tests. We attain this latter object for two reasons:—first, a minimum number of batteries is required for the entire system, and second, a reasonably uniform state of charge is maintained in the batteries by the compensation resulting from the accumulation of electrical energy in certain classes of testing and the expenditure of this energy in other classes of testing.

Referring to the drawings, Fig. 1 is a view of our invention mounted in connection with a bench or table. Fig. 2 is a diagram of the six volt generator testing circuits and Fig. 3 is one of the twelve volt generator testing circuits.

The switchboard shown in Fig. 1 has three general divisions. At the left, the circuits and equipment are arranged for the testing of generators; at the center,—for the testing of starters; and at the right,—for the testing of coils, calibration of ammeters, relays and other miscellaneous devices.

Our system of distribution has as fundamental elements two load lines one of approximately double the voltage of the other. The high (or twelve volt) line is in permanent connection across the extreme terminals of two storage batteries of equal voltage joined in series with each other. The low voltage line through a switch may be connected as desired across either one of the two batteries. Each of the three testing divisions referred to in the preceding paragraph may be connected to the high or low voltage load line by the manipulation of separate switches.

Specifying the equipment of the switchboard in detail; 200 is a voltmeter having terminals 16 and 17; 201 is an ammeter having terminals 13 and 14; 209 is an ammeter of large capacity having terminals 44 and 45, and 210 is its shunt having terminals 32 and 33; 211 is a voltmeter having terminals 40 and 41; 212 is an ammeter having terminals 42 and 43; 202 is a six volt reverse-current relay or cutout having terminals 24, 25 and 26; 203 is a twelve volt reverse-current relay having terminals 20, 21 and 22; 205 and 206 are two six volt storage batteries with their positive and negative terminals marked respectively + and —; 220 is a single pole double throw switch having contacts or points 15, 18 and 19; 204 is a triple pole double throw switch having points 23, 23', 27, 29, 29', 28, 31, 31' and 30; 207 is a heavy double pole double throw switch having points 1, 4, 2, 5, 3 and 6; 208 is a switch of like pattern having points 7, 10, 8, 11, 9 and 12; 213 is a double pole double throw switch having points 34, 35, 36, 37, 38, and 39; 214 is a single pole double throw switch having contacts 46, 47 and 48; 219 is a single pole single throw switch having contacts 52 and 53; 215 is a rheostat with a resistance coil having the terminals 49 and 50 and sliding rider 58 metallically connected to fixed terminal 51; 216 is a group of lamps terminating at binding posts 107; 217 is a group of lamps terminating at binding posts 108; 218 is a standard type of vibrating induction coil having primary binding posts 54 and 55, secondary binding posts 56 and 57 which terminate through wiring at testing terminals 109 and 110 respectively.

The purpose of the various devices with which the switchboard is equipped is as follows: Voltmeter 200 and ammeter 201 determine respectively the electrical pressure and current of a generator being tested in connection with the switchboard; the switch 220 throws into or out of circuit as desired, the relays 202 and 203; switch 204 is to form a connection between the generator testing circuits and one or both storage batteries 205 and 206 and simultaneously connect into the system one terminal of the relays 202 or 203 and disconnect a corresponding terminal of the other relay from the system; switch 207 is to connect either six volt battery 205 or 206 to the wiring of the system; switch 208 is to connect the starter testing terminals 102 and 103 with either six or twelve volt electrical supply; ammeter 209 and its shunt 210 determine the current flow in testing a starting motor; voltmeter 211 determines the voltage across terminals 104 and 105; ammeter 212 determines the current flow when testing various devices from binding posts 104 and 105; switch 213 furnishes either six or twelve volt current to 104 and 105; switch 214 throws in or out of circuit the rheostat 215; rheostat 215 forms a variable resistance for calibrating ammeters or acts as a potentiometer for testing relays; the groups of lamps 216 and 217 are for testing switches; switch 219 closes or opens the primary circuit for induction coil 218; and 218 forms a source of high voltage electricity for testing insulation from terminals 109 and 110.

The operation of our invention is as follows:

Assume that the generator 221, Fig. 1, and Fig. 2, is a six volt outfit from an automobile and is being driven by suitable means either on the bench shown or on the automobile itself supposedly standing close to the bench. And furthermore assume that the generator has no relay within it to connect and disconnect it from the storage batteries permanently connected with our switchboard. It is necessary under these conditions to throw switch 220 to the upper position which action closes the circuit between 18 of 220 and both 25 of 202 and 21 of 203. It is also necessary to throw the switch 204 to the upper position which action closes the circuit between 24 of the six volt relay 202 and 29' of 204; closes the circuit between 28 of 204 and 5 of 207; closes the circuit between 29 of 204 and 2 of 207. We will now connect the automobile generator 221 by wires 301 and 306 to the test terminals 101 and 100, the positive terminal of 221 being connected to 101 and the negative to 100. Assume now that the generator is slowly speeded up from zero. The voltmeter 200 being in connection with 100 and 101 will indicate the voltage of the generator and current will flow through the system as follows: From positive generator terminal by wire 301 to 101, thence by wire 302 to 18 on 220, out of 15, by wire 303 to 25 of 202; thru the fine wire winding of 202 and out of 24, thence by wire 304 to 23' of 204, to 29' and across a short jumper wire to 29, thence by wire 305 to terminal 100 and thence by wire 306 to negative terminal of the generator 221. As soon as the current flowing through the fine wire winding in 202 from 25 to 24 has reached a sufficiently high value, the relay operates in the well known manner and closes the contacts between 25 and 26 in this relay. When this action takes place, current continues to flow as already described but current from the generator can now charge the battery 205 as follows: From positive terminals of 221 by wire 301 to 101, thence by wire 302 to 18 of 220, out of 15, by wire 303 to 25 of 202, out of 26 by wire 307 and wire 314 to 22 of 203, by wire 308 to 14 of ammeter 201, out of 13, by wire 309 to 28 of 204, out of 27, by wire 310 to 5 of 207, out of 4 by wire 311 to positive of battery 205, out of negative of 205, by wire 312 to 1 of 207, out of 2, by wire 313 to 23 of 204, out of 29, by wire 305, terminal 100 and wire 306 to negative terminal of 221. As the generator is slowed down, the contacts between 25 and 26 in 202 separate in the well known manner, restoring former conditions. It will now be observed that had the switch 207 been set in the lower position, the battery 206 would have been charged instead of 205. In order to maintain both batteries in good condition it is customary to change this battery switch 207 once daily.

Let us now assume a second case in which the generator 221 has a relay within it. In this case the switchboard relay is not necessary and is thrown out of circuit by throwing the switch 220 to the down position which action closes the circuit from 18 on 220 to 22 on 203 thus: From 18 to 19 on 220, thence by wire 314 to 22 on 203.

In testing a twelve volt generator using the switchboard relay 203, the switch 220 is thrown to the upper position as before and the switch 204 is thrown down. See Fig. 1 and Fig. 3. In this case the relay 203 is excited in a manner similar to that described with 202. When contacts are closed between 22 and 21, current charging both 205 and 206 in series, flows as follows: From positive of 221 by 301 to 101, by 302 to 18 of 220, out of 15, by 303 to 21 of 203, out of 22, by 308 to 14 of 201, out of 13, by 309 to 28 of 204, out of 30 by 315 to 4 of 207, by 311 to positive of 205, out of negative 205, by 312 to 1 of 207, across jumper 316 to 6, by 317 to positive 206, out of negative 206, by 318 to 31 of 204, out of 29, by 305 to 100, by 306 to generator 221 negative. Observe that it is immaterial whether switch 207 is in the upper or lower position so far as twelve volt charging is concerned. Also observe that the voltage between 2 and 5 of 207 is always approximately six whether a generator is on charge or not and also note that the polarity of 5 is always positive and that of 2 always negative. Further notice that the voltage between 4 and 3 of 207 is always approximately twelve and that 4 is always positive and 3 always negative. Bearing these conditions in mind, it will be apparent we can test a starter on either six or twelve volts from terminals 102 and 103 at the same time that either a six or twelve volt generator is being tested without any practical interference and the charging voltage may be equal, one half or twice that of the starter testing voltage.

Now assume we are to test a starting motor normally operating on six volts. The switch 208 must be thrown to the upper position. Assume all other switches are set as shown in Fig. 1. Current flows from positive 205 by 311 to 4, out of 5 by 310 to 319 and by 319 to 10, out of 11 to 32, out of 33, by 320 to 103, by 321 to positive of starting motor 222, out of negative, by 322 to 102, by 323 to 8 of 208, out of 7, by 324 to 2 of 207, out of 1, by 312 to 205 negative. If the starting motor normally operates on twelve volts, then switch 208 is thrown down, thus forming the following circuit: From positive 205 by 311 to 4, by 315 to 325 and 325 to 12 of 208, out of 11 to 32 of 210, out of 33, by 320 to 103, by 321 to positive of 222, out of negative 222, by 322 to 102, by 323 to 8 of 208, out of 9, by 326 and 318 to negative 206, out of positive 206, by 317 to 6 of 207, across jumper 316 to 1 and from 1 by 312 to 205. It will now be observed that the voltage between 11 and 8 of 208 is either six or twelve dependent on whether 208 is up or down respectively. It will also be observed that 11 is always positive and 8 always negative.

The switch 213 is wired in a similar manner. The voltage between 37 and 36 is either six or twelve dependent on whether 213 is up or down respectively, and 37 is always positive and 36 always negative. Bearing these conditions in mind, in describing the operation of 213 and the circuits which it controls, we will describe only the circuits from 36 and 37 considering these points as the source of electric energy.

Assume we are to calibrate an ammeter 223 connected as indicated and compare its readings with those of 212, switch 214 is thrown to the upper position. Current flows from 37 by 327 to 42 of 212, out of 43 to 47 of 214, out of 46, by 328 to 49 of rheostat 215, out of rider 58 to 51, by 329 to 105, by 330 to positive 223, out of negative 223 to 104, by 331 to 36. The sliding of the rider 58 varies the current flow to the desired amount.

Now observe that if a jumper wire be connected between 104 and 106 current can flow clear through from 49 to 50 in 215 and that a varying potential can be obtained between 104 and 105 according to the position of the rider 58 on rheostat 215, thus producing a potentiometer for testing relays of the type indicated as a part of the switchboard equipment. As the voltmeter 211 is in connection with 104 and 105 the potential existing between them can be determined.

When using the banks of lamps 216 and 217 for testing switches it is convenient to throw switch 214 down thus cutting the rheostat 215 out of the circuit.

It will be understood that the relative positions of devices forming a part of the invention, may be changed to a considerable degree and the particular type of switches herein indicated as knife switches, changed substantially in form without departing from the spirit of our invention.

In conclusion it will be recalled that we have attained all the objects of our invention. Each testing section of our system of distribution is in operative effect substantially independent of the others although a single set of storage batteries is in connection with all. The polarity of any pair of testing terminals remains constant and the voltage required for any certain test is substantially uniform and selective regardless of the nature of other simultaneous testing operations. Furthermore, since our system uses storage batteries in common for all classes of testing and since in practice there is a reasonable balance between the electrical energy accumulated in the testing of generators and such energy expended in the testing of starting motors, horns and other devices operative from an external power source, we have attained our object of using a minimum number of batteries and maintaining therein a practically uniform state of charge.

Having described our invention what we claim as new and desire to secure by Letters Patent is:

In combination in a system for testing automotive electrical devices, two storage batteries of approximately equal voltage permanently joined in series, a generator-testing circuit, selective switching means to connect the said two series-coupled batteries to the generator-testing circuit, or either one of the two batteries preferred to the generator-testing circuit, two reverse-current relays operative at different potentials each being provided to perform the usual functions of making and breaking a battery charging circuit, and switching means for including one of the relays in the generator-testing circuit when desired, the said switching means being arranged to insure the inclusion of the relay of operative voltage appropriate to that impressed on the generator-testing circuit.

ANDREW C. LYEN.
CHARLES W. MORGAN.